3,278,514
AZO COBALTICINIUM COMPOUNDS
Peter L. Pauson, Bearsden, Scotland, and Graham R. Knox, Thorpe, Norwich, England, assignors to Ethyl Corporation, New York, N.Y., a corporation of Virginia
No Drawing. Filed Apr. 24, 1962, Ser. No. 189,712
4 Claims. (Cl. 260—149)

This invention relates to novel organometallic compounds and to a process for their formation. More specifically, this invention relates to organometallic compounds of titanium, vanadium, chromium, manganese, cobalt and nickel. The novel compounds disclosed herein are bis(azocyclopentadienyl) compounds of these transition metals.

An object of this invention is to provide novel organometallic compounds containing azo radicals. A further object is to provide new bis(azocyclopentadienyl) transition metal compounds. Another object is to provide novel compounds of titanium, vanadium, chromium, manganese, cobalt and nickel.

The objects of this invention are accomplished by providing novel organometallic compounds having the formula $$[(Q-N=N-R)_2M^a(X)_b](Y)_c$$

wherein Q is a cyclopentadienyl radical having 5 to about 13 carbon atoms, R is a hydrocarbon radical having one to about 10 carbon atoms, M is selected from the class consisting of titanium, vanadium, chromium, manganese, cobalt and nickel, X is a halogen of atomic number at least 17, Y is an anion selected from the class consisting of chloride, bromide, iodide, picrate, Reineckate and tetraphenylborate, and $a$, $b$, and $c$ are integers; when M is cobalt $a=+1$, $b=0$ and $c=1$; when M is titanium $a=0$, $b=2$ and $c=0$; and when M is selected from the subclass consisting of vanadium, chromium, manganese and nickel, $a$, $b$ and $c$ are equal to zero.

These novel compounds are prepared by a process, the first step of which comprises reacting a diazocyclopentadiene with an alkali metal organometallic compound having the formula R—M' wherein R is a hydrocarbon radical having one to about 10 carbon atoms and is selected from the class consisting of alkyl, aralkyl, cycloalkyl, aryl, and alkaryl radicals and the like. Preferably, R is an alkyl or aryl radical. The most preferred radicals are the ethyl and phenyl radicals.

The alkali metal, M, is selected from the alkali metals lithium, sodium, potassium, cesium and rubidium. The preferred alkali metals are lithium, sodium and potassium. The most preferred metal is lithium.

The diazosubstituted cyclopentadiene reacted in the first step of this novel process can be selected from a wide variety of diazosubstituted cyclopentadienes. The most preferred compound is diazocyclopentadiene, $C_5H_4NN$. Higher analogs of this compound which are suitable in this process are represented by the following formula:

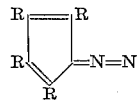

As illustrated by the above formula, diazocyclopentadiene may be substituted by one or more hydrocarbon radicals represented by the various R's appended to the ring. No limitation as to size or complexity of these hydrocarbon substitutents has been found. However, good yields of the compounds of this invention are prepared when the diazocyclopentadiene ring is substituted by hydrocarbon radicals having one to about 8 carbon atoms. Multisubstituted diazocyclopentadienes are applicable in this invention. However, it is preferred that the total number of carbon atoms in these starting compounds does not exceed about 13. The preferred substituted diazocyclopentadienes are monosubstituted derivatives wherein the total number of carbon atoms does not exceed 13.

The hydrocarbon substituents represented by the R's in the above formula can have the alkyl, cycloalkyl, aralkyl, aryl, alkaryl and similar configurations. Illustrative but not limiting examples of these substituents are methyl, ethyl, isopropyl, tert-butyl, 4-hexenyl, cyclohexyl, cyclohexenyl, phenyl, tolyl, xylenyl and similar radicals.

Although not bound by any theory, it is believed that the intermediate formed by reaction of a diazocyclopentadiene with the organoalkali metal compound is an alkali metal salt having a configuration similar to the formula below, wherein diazocyclopentadiene is the starting material.

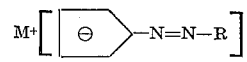

In this formula, M is an alkali metal and R is an organic radical derived from the organic alkali metal compound. This intermediae is reacted with a transition metal halide wherein the transition metal is selected from the class consisting of titanium, vanadium, chromium, manganese, cobalt and nickel. Illustrative but not limiting examples of the applicable metal halides are titanium tetrabromide, titanium tetrachloride, vanadium trichloride, chromium trichloride, manganese diiodide, cobalt trichloride, and nickel dichloride. These halides have the generic formula $M_1X_n$ wherein X is a halogen having an atomic number of at least 17 and $n$ is an integer equal to the valence of the transition metal, $M_1$.

Other compounds of these transition metals are also applicable in this process. Complex halides such as tetrapyridine nickel dichloride can be employed. Chelates such as the acetonyl acetates of these metals are also applicable. The choice of the metal reactant is partially governed by its cost, stability and solublility in the solvents employed in this process.

The process of this invention proceeds well as long as the reagents are sufficiently contacted. Though a solvent is not necessary, a solvent affords a homogenous reaction mixture and aids the interaction of the various reactants. Thus, a solvent generally reduces the reaction time. In some instances, all of the reactants are not soluble in the same solvent. In these cases, a mixture of solvents can be employed or a suspension of the insoluble ingredient(s) in the solution of the soluble ingredient(s) can be employed. Examples of suitable solvent mixtures are diethylether-tetrahydrofuran, dibutylether-dimethoxyethane and the like.

Usually the process of this invention is carried out in the presence of a non-reactive organic solvent. Ethers are suitable and comprise a preferred class of solvents. The ethers may be cyclic or acyclic in nature. Monodentate, bidentate and tridentate ethers can be employed. Examples of ethers suitable as solvents in the process are diethylether, dibutylether, dimethoxyethane, dimethoxypropane, diethyleneglycol dimethylether, diethyleneglycol dibutylether, tetrahydrofuran, dioxane and the like.

Other classes of solvents can be employed if desired. Those solvents that are non-reactive toward the products and reactants and which readily dissolve the products and reactants and which can readily be removed from the reaction mixture are preferred.

The reaction time is not a truly independent variable but is dependent partially upon the other reaction conditions employed. Satisfactory results are generally obtained when the reaction is carried out for a period of one hour to three days.

The reaction proceeds well at atmospheric pressure although higher or lower pressures can be employed if desired. Usually the reaction is carried out at a temperature within the range of −40 to 75° C. Higher or lower temperatures can be employed if desired. It is preferred that the reaction temperature afford a reasonable rate of reaction and not be so high as to destroy the products or reactants.

As illustrated by the following examples, the intermediate compound obtained by reaction of the diazocyclopentadiene with the organic alkali metal compound need not be isolated. The transition metal compound may be added directly to the reaction mixture after the organic alkali metal compound and diazocyclopentadiene have sufficiently interacted. It is preferred that the transition metal compound be added to the reaction mixture after the intermediate has been formed in optimum yield.

Generally, the novel compounds produced by this process are deeply colored crystalline solids. They may be obtained from the reaction mixture and subsequently purified by techniques familiar to those skilled in the art. For example, the compounds may be isolated by distillation of the solvent or by a chromatographic technique. Purification can be afforded by recrystallization, sublimation, chromatography, and similar techniques.

The following examples illustrate the process of this invention and the new compounds produced thereby. All parts and percentages are by weight unless otherwise noted.

*Example I*

Diazocyclopentadiene (2760 parts) in 14,000 parts of diethylether was added dropwise to a rapidly stirred solution comprising 2,520 parts of phenyllithium and 3,500 parts of diethylether. The addition was carried out under nitrogen at −30° C. A scarlet precipitate was formed. After 30 minutes, 1,940 parts of cobaltous chloride were added and the mixture was stirred overnight, being allowed to warm up gradually to room temperature. The solvent was removed in vacuo; 5,000 parts of two Normal hydrochloric acid were added and the mixture was then heated to 100° C. for 10 minutes. The deep-red solution was filtered while hot, and during cooling there were deposited 71 parts of 1,1′-di(phenylazo) cobalticinium chloride. Recrystallization from two Normal hydrochloric acid gave dark red, slightly hygroscopic crystals having a melting point of 138–139° C. with decomposition. On analysis there was found: C, 60.9; H, 4.1; N, 12.5; Cl, 7.9. $C_{22}H_{18}ClCoN_4$ requires: C, 61.0; H, 4.2; N, 12.9; Cl, 8.2 percent. From half of the filtrate, the corresponding Reineckate salt, 1,1′-di(phenylazo) cobalticinium Reineckate, was precipitated. Recrystallization from acetone gave orange-brown crystals having a melting point of 217–219° C. with decomposition from 190° C. On analysis there was found: C, 43.2; H, 3.2; N, 19.3. $C_{26}H_{24}CoCrN_{10}S_4$ requires: C, 43.6; H. 3.4; N, 19.6 percent. The remainder of the filtrate was precipitated as the tetraphenylborate salt, 1,1-di(phenylazo) cobalticinium tetraphenylborate, which formed brown plates from acetone which decomposed above 160° C. On analysis there was found: C, 76.8; H, 5.1; N, 7.6 percent. $C_{46}H_{38}BCoN_4$ requires: C, 77.1; H, 5.4; N, 7.8 percent.

*Example II*

To phenylazocyclopentadienyllithium, prepared by addition of diazocyclopentadiene to phenyllithium, as in Example I, a solution comprising 2.84 parts of titanium tetrachloride in 18 parts of tetrahydrofuran was added. This mixture was stirred overnight at room temperature. The solvent was then removed in vacuo; the residue was triturated with benzene, and the benzene extract was again evaporated to leave a red gum which crystallized with some difficulty from benzene-ligroin solvent mixtures. In this manner, di(phenylazocyclopentadienyl) titanium dichloride was obtained as a brown solid having a melting point of 198–204° C. with decomposition occurring from 175° C. On analysis there was found: C, 57.2; H, 3.8; N, 11.9 percent. $C_{22}H_{18}Cl_2N_4Ti$ requires: C, 57.8; H, 4.0; N, 12.3 percent.

*Example III*

A dibutylether solution of 2-methyldiazocyclopentadiene is added dropwise to a rapidly stirred solution of phenyllithium in dibutylether at −30° C. After 30 minutes, vanadium trichloride is added and the mixture is stirred for 18 hours while gradually warming to room temperature. The solvent is removed in vacuo and the residue triturated with petroleum ether. The product di[2-methyl(phenylazo)cyclopentadienyl] vanadium is obtained.

*Example IV*

A diethyleneglycol dimethylether solution of 3-tert-butyldiazocyclopentadiene is added dropwise to a rapidly stirred diethyleneglycol dimethylether suspension of ethylsodium at −10° C. After 40 minutes, chromium trichloride is added and the mixture stirred for 24 hours while gradually warming to −5° C. The solvent is removed in vacuo and the residue is triturated with benzene. The product di[3-tert-butyl(ethylazo)cyclopentadienyl] chromium is obtained.

*Example V*

A diethylether solution of 3-octyldiazocyclopentadiene is added dropwise to a rapidly stirred diethylether solution of benzyllithium at −40° C. After one hour, manganese dichloride is added and the mixture stirred for 48 hours while gradually warming to −5° C. The solvent is removed in vacuo and the residue triturated with hexane. The product di[3-octyl(benzylazo)cyclopentadienyl]manganese is obtained.

*Example VI*

A tetrahydrofuran solution of diazocyclopentadiene is added dropwise to a rapidly stirred tetrahydrofuran solution of 3-butylphenyllithium at −25° C. After 30 minutes, vanadium tribromide is added and the mixture stirred for 24 hours while gradually warming to room temperature. The solvent is removed in vacuo and the residue triturated with benzene. The product di(3-butylphenylazocyclopentadienyl) vanadium is obtained.

*Example VII*

A dioxane solution of diazocyclopentadiene is added dropwise to a rapidly stirred solution of 3-methyl-nonyl-lithium in dioxane at −40° C. After 40 minutes, chromium tribromide is added and the mixture stirred for 22 hours while gradually warming to −30° C. The solvent is removed in vacuo and the residue triturated with petroleum ether. The product di(3-methyl-nonylazocyclopentadienyl) chromium is obtained.

*Example VIII*

A diethylether solution of diazocyclopentadiene is added dropwise to a rapidly stirred diethylether solution of α-cyclohexylethyllithium at 10° C. After 50 minutes, titanium tetrachloride is added and the mixture stirred for 40 hours while gradually warming to 40° C. The solvent is removed in vacuo and the residue triturated with hexane. The product di(α-cyclohexylethylazocyclopentadienyl) titanium dichloride is obtained.

*Example IX*

A dimethoxyethane solution of diazocyclopentadiene is added dropwise to a rapidly stirred suspension of phenylpotassium in diethylether at −40° C. After 30 minutes, chromium acetyl acetonate is added and the mixture stirred for 40 hours while maintaining the solution at −40° C. The solvent is removed in vacuo and the residue triturated with hexane. The product di(phenylazocyclopentadienyl) chromium is obtained.

Example X

A diethylether solution of 2,3-dibutyldiazocyclopentadiene is added dropwise to a rapidly stirred diethylether solution of ethyllithium at −30° C. After 30 minutes, manganese diiodide is added and the mixture stirred for 24 hours while gradually warming to 30° C. The solvent is removed in vacuo and the residue triturated with benzene. The product di[2,3-dibutyl(ethylazo)cyclopentadienyl] manganese is obtained.

Example XI

To a dibutylether solution of phenylazocyclopentadienyllithium, prepared as in Example I, cobaltous bromide is added and the mixture stirred overnight at room temperature. The solvent is removed in vacuo. Two N hydrobromic acid is added and the mixture heated to 80° C. for 30 minutes. The solution is filtered while hot. During cooling, 1,1-(diphenylazo) cobalticinium bromide is deposited. To a warm solution of this product is added picric acid. The corresponding picrate is precipitated. The compound, 1,1′-di(phenylazo) cobalticinium iodide is prepared from cobaltous iodide and phenylazocyclopentadienyl lithium.

The organometallic compounds of this invention are useful as additives to hydrocarbon fuels and lubricants. For example, when added to a hydrocarbon fuel of the gasoline boiling range, many of the compounds are found to increase the octane number of the fuel. The compounds may be added to gasoline along with halohydrocarbon scavengers such as ethylene dichloride and ethylene dibromide, phosphorus ignition control compounds such as tricresyl phosphate, and other antiknock agents such as tetraethyllead, methylcyclopentadienyl manganese tricarbonyl and the like. The compounds are also useful as additives to residual and distillate fuels such as jet fuels, home heater fuels, and diesel fuels to reduce smoke and/or soot formation. In addition, the compounds may be employed as additives to solid propellants to control the burning rate. Still further use for the compounds is as ultraviolet light absorbers.

The compounds may also be used as metal sources in metal plating operations. When so employed, the compounds are decomposed at elevated temperatures so as to lay down a metal-containing film on a substrate material. Preferably, the film-forming operation is carried out in the presence of a reducing gas such as hydrogen or an inert gas such as nitrogen so as to prevent oxidation of the substrate material or the film during the film-forming operation. The metal-containing films serve a number of useful and desirable purposes. Thus, they may be employed to produce a decorative effect on the substrate material, to serve as a protective coating or to form a conductive surface. In the latter application, the compounds can be employed in forming printed circuits by decomposing the organometallic compound so that it lays down an electrically conductive metal-containing film on selected portions of the substrate material. This is conveniently accomplished by first covering the substrate material with a stencil and then conducting the plating operation so as to form a film on those portions of the substrate material which are not covered by the stencil.

The novel compounds are also useful as chemical intermediates, pharmaceuticals and biocides such as fungicides, herbicides and pesticides.

Having fully described this invention, it is intended that it be limited only within the spirit and scope of the following claims.

We claim:
1. An organometallic compound having the formula

$$[(Q-N=N-R)_2Co]^+(Y^-)$$

wherein Q is a cyclopentadienyl radical having 5 to about 13 carbon atoms, said cyclopentadienyl radical being solely composed of carbon and hydrogen, R is a hydrocarbon radical having one to about ten carbon atoms, Y is an anion selected from the class consisting of chloride, bromide, iodide, picrate, Reineckate, and tetraphenylborate.

2. 1,1′-di(phenylazo) cobalticinium chloride.
3. 1,1′-di(phenylazo) cobalticinium Reineckate.
4. 1,1′-di(phenylazo) cobalticinium tetraphenylborate.

References Cited by the Examiner
UNITED STATES PATENTS 3,071,605   1/1963   Morehouse _____ 260—429

OTHER REFERENCES

Knox, G. R.: Proc. Chem. Soc., London (1959), pp. 56–7.

CHARLES B. PARKER, *Primary Examiner.*

JOSEPH P. BRUST, *Examiner.*

NORMA S. MILESTONE, REYNOLD J. FINNEGAN, DONALD M. PAPUGA, *Assistant Examiners.*